United States Patent [19]

Zucco

[11] 4,282,662
[45] Aug. 11, 1981

[54] ROTARY TRENCH DIGGING MACHINE

[75] Inventor: Louis Zucco, Maubourguet, France

[73] Assignee: Roger Bourgela, Mezin Sainte Maure de Peyriac, France

[21] Appl. No.: 108,038

[22] Filed: Dec. 28, 1979

[30] Foreign Application Priority Data

Jun. 30, 1978 [FR] France .............................. 78 20435
Apr. 24, 1979 [FR] France .............................. 79 10973

[51] Int. Cl.³ .............................................. E02F 5/08
[52] U.S. Cl. ............................... 37/94; 37/80 A; 37/DIG. 16
[58] Field of Search ..................... 37/94–97, 37/91, 80 R, DIG. 16, 80 A, 142.5

[56] References Cited

U.S. PATENT DOCUMENTS

| 121,846 | 12/1871 | Bussell | 37/80 A |
|---|---|---|---|
| 244,400 | 7/1881 | Plumb | 37/94 |
| 275,372 | 4/1883 | Fagan | 37/94 |
| 1,538,565 | 5/1925 | Loken | 37/94 |
| 2,403,367 | 7/1946 | Howard | 37/94 |
| 2,602,410 | 7/1952 | Vaughn | 37/80 A X |
| 3,654,713 | 4/1972 | Craddick et al. | 37/80 A |
| 3,936,961 | 2/1976 | Gahler | 37/142.5 |
| 3,986,280 | 10/1976 | Johnson | 37/80 A |

FOREIGN PATENT DOCUMENTS 1175390 12/1969 United Kingdom ...................... 37/94

*Primary Examiner*—Clifford D. Crowder
*Attorney, Agent, or Firm*—Erwin S. Teltscher

[57] ABSTRACT

A trench-digging machine which may normally be moved in a forward direction, includes a frame, a rotatable soil-moving disc mounted on the frame for digging a trench in the soil, thereby throwing up earth, a transmission-gear mounted on the frame, coupled to the rotatable soil-moving disc, and adapted to be powered by an external drive mechanism, a control device mounted on the underside of the frame to regularize the depth of the trench cut by the soil-moving device, a soil-deflector plate mounted on the frame for deflecting earth operatively thrown up by the soil-moving disc, and rotatable and vertically movable trench side-surface processing discs mounted on the frame downstream of the soil-moving disc as defined by the forward direction of movement.

10 Claims, 10 Drawing Figures

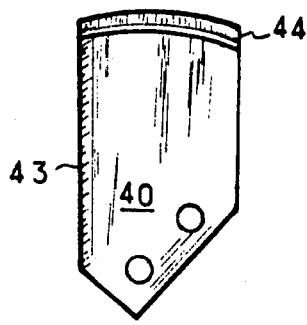
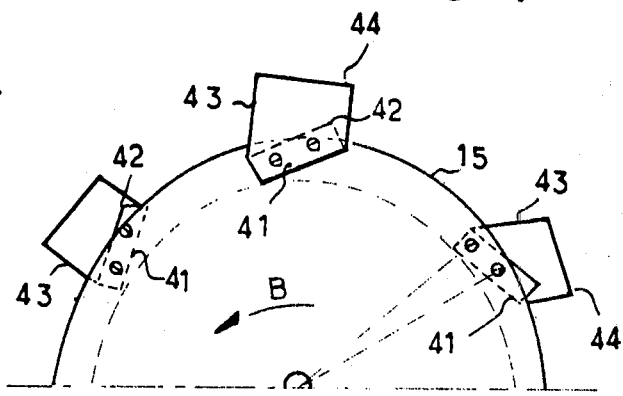
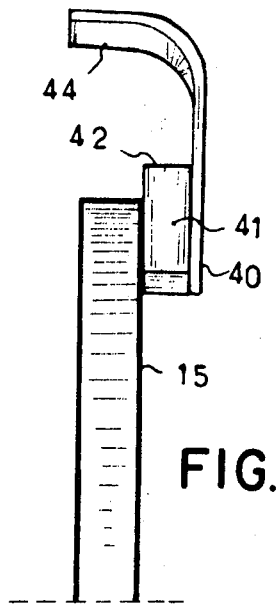
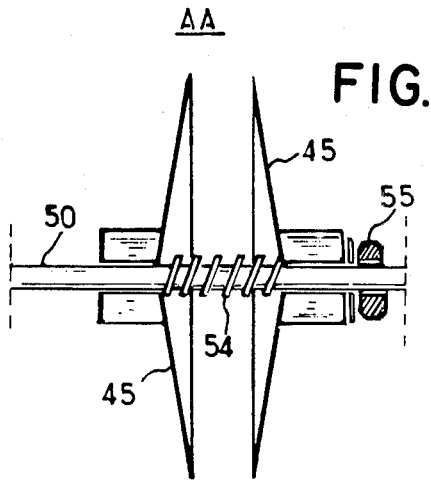

ROTARY TRENCH DIGGING MACHINE

BACKGROUND OF THE INVENTION

The present invention relates to simple, light-weight machine for digging trenches, so as to drain and dry soils, particularly in agricultural land.

In order to preserve crops sown on low-lying land, farmers usually have to dig trenches in order to drain the water from the land, so as to prevent the seeds in the soil from rotting. Similarly, trenches are also dug to prevent torrential rains from furrowing or gullying sloping land.

In earlier times or primitive cultures the trenches were customarily dug with pick-axes, which is time-consuming hard work, or more efficiently with a plow. But the use of a plow has the disadvantage that it tends to build up earth on one side of the trench dug, which may in turn cover an adjacent furrow, into which seeds have been sown. This, in turn, has a detrimental effect on the crop, and furthermore trenches dug in this way are usually irregular, and tend to be filled up with earth particularly in bad weather, due to the tendency of moist earth to slip.

SUMMARY OF THE INVENTION

It is accordingly an object of the present invention to obviate these drawbacks, and to devise a trench-digging machine which is capable of digging a deep and narrow trench between two furrows containing crops, without building up any significant earth heaps adjacent to the furrows. It is a further object of the present invention, that the machine should not damage crops adjacent to the trench being dug, and that the trench dug should have firm sides, so that the trench can last a whole season, and without requiring any further digging for the season.

This object is attained, according to the present invention, by providing a trench-digging machine, normally movable in a forward direction, which includes a frame, rotatable soil-moving means mounted on the frame for digging a trench in the soil, thereby throwing up earth, transmission-gear means mounted on the frame, coupled to the rotatable soil-moving means, and adapted to be powered by external drive means, control means mounted on the underside of the frame to regularize the depth of the trench cut by the soil-moving means, soil deflector means mounted on the frame for deflecting earth operatively thrown up by the soil-moving means, and rotatable and vertically movable trench side-surface processing means mounted on the frame downstream of the soil-moving means, as defined by the forward direction of movement.

It is advantageous if the external drive means includes a tractor, if the control means include substantially horizontally mounted ski-means, if the soil-moving means includes a disc which has cutter means mounted on its periphery, if the deflector means are at least partially curved, and if the trench side-surface processing means include two rotatable discs.

The soil-moving disc with its cutters is rotated in a direction opposite to the direction of the wheels of the tractor powering and moving the trench-digging machine, so that the soil-moving disc throws up earth and stones towards the curved deflector-means or plate, thus breaking up the earth into small fragments, and thus causing it to be spread over a minimum width of two meters. The depth of the trench is controlled by the ski-means mounted longitudinally below the frame along the soil-moving disc.

In an alternate embodiment, the soil-moving disc may include a plurality of shovels mounted on its periphery.

Where a plurality of cutters are disposed around the periphery of the soil-moving disc, it is advantageous to interpose a block between each cutter and the disc; each block preferably has an outwardly facing surface inclined at an acute angle to a plane tangent to the periphery of the disc near a corresponding one of the cutters.

The cutter advantageously has a stem portion, and a curved portion extending in at least a radially outward direction beyond the stem portion.

The ski-means include at least one ski, and first and second supports therefor secured to the frame, and located upstream and downstream of the disc, respectively; the ski is preferably hingably supported by the first support, and adjustably supported by the second support in at least a vertical direction.

The trench side-surface processing means preferably include two grinding discs for smoothing the side surfaces of the trench, respectively, which are advantageously adapted to be powered by the external drive means.

The grinding discs are preferably coaxially mounted on the frame, and each grinding disc has preferably an outwardly facing convex portion.

It is advantageous to provide resilient means, interposed between the grinding discs, such as a spring, for urging the discs apart.

It is further advantageous to provide a shaft which may be pivoted on the frame, and to mount the trench side-surface processing means, such as the grinding discs, on the pivotable shaft.

It is also advantageous if a rotatable axle is journalled in the frame, and if the soil-moving disc is mounted on, or near one end of the axle, and a flywheel is mounted on, or near, the other end of the axle.

It is also advantageous, if the rotary axle journalled in the frame is driven by belts, which in turn pass over a pulley, which can be adjusted so as to tighten the belts. The belt-tensioning pressure of the pulley is maintained by means of a spring, which allows the belts to slip, when the soil-moving disc encounters a stone or roots in the soil.

In a modified version of the invention, the trench-digging machine may have a second ski mounted parallel to the first ski.

In an alternate and preferred embodiment of the present invention a second soil-moving disc is provided, together with a second deflector mounted on the other side of the frame, so that two trenches can be dug simultaneously.

BRIEF DESCRIPTION OF THE DRAWING

The invention will be better understood with the aid of the accompanying drawing, in which:

FIG. 6 is an elevation view of a preferred embodiment of the disc cutter;

FIG. 7 shows a portion of the soil-moving disc with the cutters mounted on its periphery;

FIG. 8 is a side view of the cutter mounted on a soil-moving disc;

FIG. 9 is a section of the side-surface processing discs; and

DESCRIPTION OF THE PREFERRED EMBODIMENTS

Figure 2:
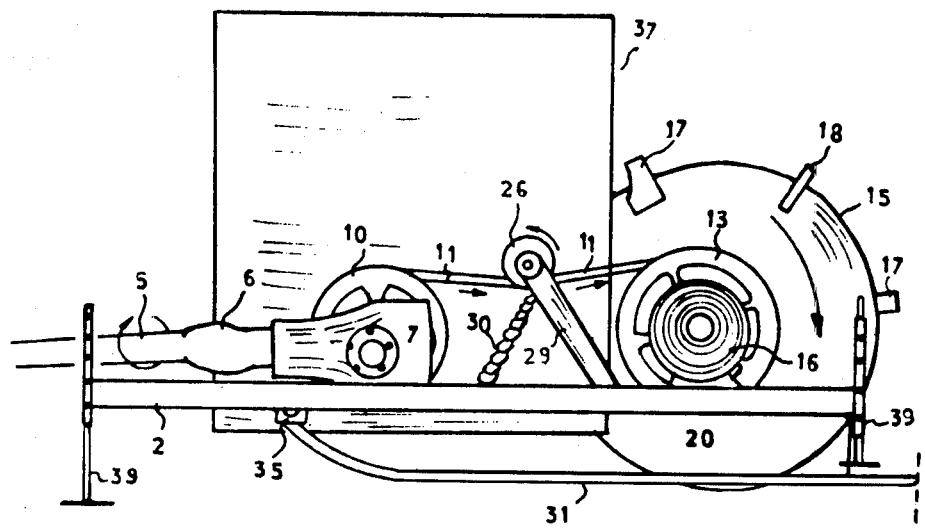
FIG. 2 is a side elevation of the trench-digging machine, as viewed from the gear-end side.
Figure 3:
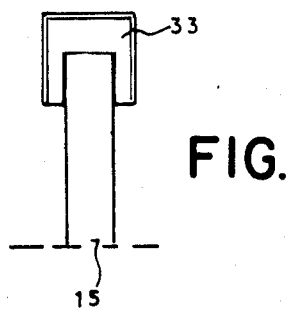
FIG. 3 is a side elevation of the trench-digging machine as viewed from the soil-moving disc, and deflector side.

Referring now to the drawing, the trench-digging machine, according to the present invention, includes a substantially rectangular frame 2, which has attachment locations 1, where a tractor can be attached. The external tractor provides driving power not only to move the trench-digging machine, but also to drive the soil-moving disc 15 through a flexible joint 4, a transmission shaft 5, and a second flexible joint 6, which in turn drives a bevel gear drive enclosed in a protective casing 7. A shaft 8 transversely disposed with respect to the longitudinal frame 2, is driven by the bevel gear, and is journalled in bearings 9. A multi-groove pulley 10, best seen in FIG. 2, is mounted on the shaft 8, and driving belts 11 connect the pulley 10 to a pulley 13, which is mounted on the shaft 12. The shaft 12 is in turn journalled in the frame 2 by means of bearings 14; it may be seen that the shaft 12 projects on either side of the frame 2 therebeyond; one projecting end of the shaft 12 carries the soil-moving disc 15, and the other end a regulating flywheel 16. It is the prime purpose of the flywheel 16 to provide a smooth motion of the soil-moving disc 15, and also to equalize the stress born by the bearings 14, so as to extend their life.

Figure 4:
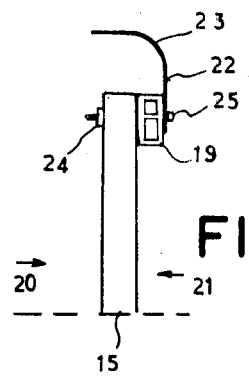
FIG. 4 is an elevation of a detail of a cutter attachment for the soil-moving disc.
Figure 5:
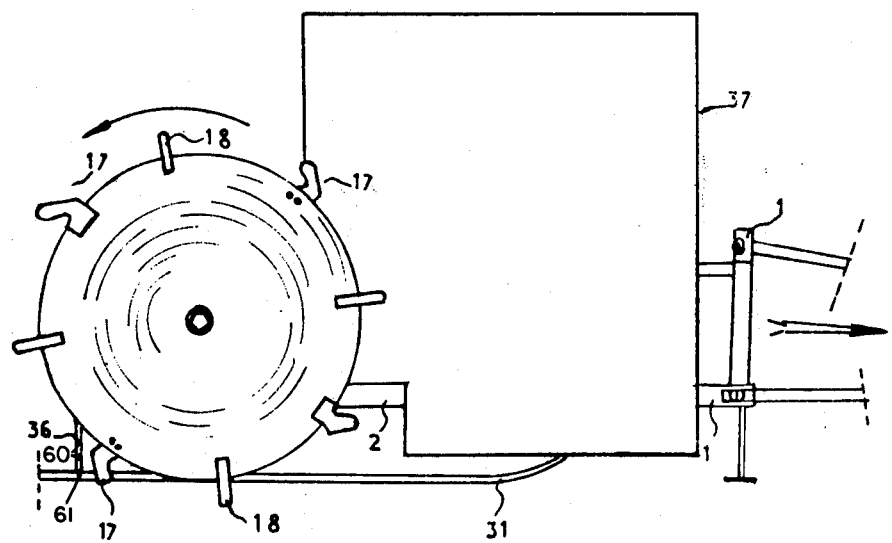
FIG. 5 is an elevation of a detail showing the shovel attachment for the soil-moving disc.

In a preferred embodiment the soil-moving disc 15 carries four cutters 17 and four shovels 18 alternately spaced at regular intervals along the circumference of the soil-moving disc 15. The cutters 17 are mounted on the soil-moving disc 15 by means of blocks or supports 19, interposed between the respective cutters 17, and the disc 15. A bolt 25 passes through each cutter 17, each block 19, and the disc 15, and a nut 24 is threaded onto the bolt 25, so as to secure the cutter 17, the block 19, and the disc 15 to one another. In FIG. 4 the outer side of the soil-moving disc 15 is denoted by the reference numeral 21, while the inner side is denoted by the reference numeral 20. Each cutter 17 includes a blade 22 curved so as to extend at least radially outwardly beyond the disc 15 and curves in a smooth manner so as to extend in a direction parallel to the tangent of the soil-moving disc 15. Each shovel 18, best seen in FIG. 5, includes a substantially rectangular part 33 closely fitted around the rim or periphery of the soil-moving disc 15. As can be best seen from FIGS. 1 and 2, a pulley 26 for tightening the belts 11 is provided, and is mounted on a shaft 27, the shaft 27 being journalled on its opposite ends in respective bearings 28. Each bearing 28 is mounted on a free extremity of a bar 29, whose other end 34 is pivotably connected to the frame 2. A helical spring 30 is connected between the frame 2 and the shaft 27, so as to exert pressure on the belts 11.

A ski-shaped longitudinal bar 31 is mounted below the frame 2, and extends in a direction parallel with the soil-moving disc 15. The ski-type bar 31 is pivotably connected to the frame 2 by means of a support 35 near the front-end of the trench-digging machine, and is fixedly connected to the frame 2 near the rear end of the trench-digging machine, through a vertical bar 36, best seen in FIG. 1. The vertically extended bar 36 has a plurality of openings 60 therein, which are so arranged that the ski 31 can be secured to the bar 36 at varying vertical levels. Thus it is possible to set or regulate the depth of the trench cut; a locking pin 61 passing through one of the openings 60 secures the ski 31 adjustably to the bar 36.

Figure 1:
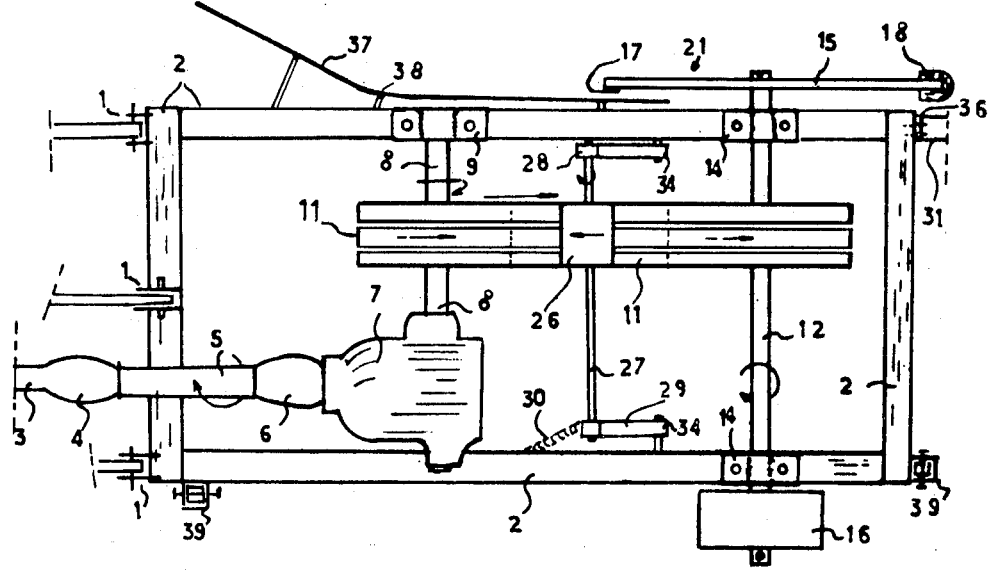
FIG. 1 is a plan view of the trench-digging machine, according to the present invention, with its protective casing removed.

A curved deflector plate 37 is secured to the frame 2 upstream of the location of the soil-moving disc 15; as will be seen best from FIG. 1, the deflector plate 37 curves outwardly, the break point occuring at a location denoted as 38.

The trench-digging machine is additionally provided with stabilizing feet or pedestals 39, which may be vertically adjusted, and which are disposed on a side opposite to that of the soil-moving disc 15, for balancing the trench-digging machine, when it is at rest. When the machine, according to the present invention, is to be employed on stony land, it is not feasible to employ the shovels 18; instead there are employed specially constructed cutters 40, shown in FIGS. 6, 7 and 8.

The specially constructed cutters 40 are mounted alternately on either side of the soil-moving disc 15 near its periphery. A preferably rectangular block 41 is interposed between the disc 15 and each cutter 40, so that an outwardly facing surface of the block 41 is inclined at an acute angle to a plane tangent to the periphery of the disc 15 near a corresponding cutter 40.

It will therefore be seen that a groove-like space is formed between one side of an edge 42 of the block 41, and a radially outwardly extending end portion 44 of the cutter 40, which is curved in a direction parallel to the tangent of the soil-moving disc 15. The soil-moving disc 15 rotates in a direction indicated by the arrow B, and operatively ejects any earth caught in the aforedescribed constricted space from the soil-moving disc 15 to the deflector plate 37. Each cutter 40 will be seen to be provided with a sharp cutting edge 43, so as to dig deeply into the soil.

For the purpose of smoothing and stabilizing both sides of the dug trench, particularly in soil which may easily crumble, two grinding discs 45 are provided on the rear portion of the frame 2, substantially in the wake of the soil-moving disc 15.

Figure 10:
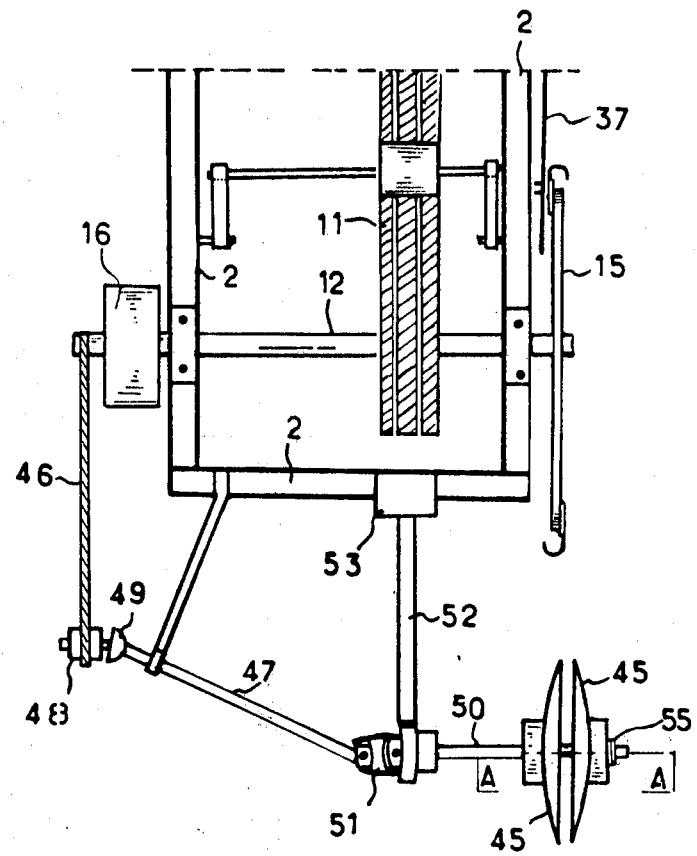
FIG. 10 is a plan view of a preferred version of the side-surface processing discs mounted on the frame of the trench-digging machine.

As shown in FIG. 10, the grinding discs 45 are connected to, and powered by, the motion of the shaft 12. The rotary motion of the shaft 12 is transmitted to the grinding discs 45 through flexible joints 49 and 51. The flexible joint 49 is coupled to the shaft 12 by means of a belt 46, and the rotary motion of the shaft 12 is first transferred to a pulley 48, which forms part of the first flexible joint 49. A shaft 47 is in turn connected to the flexible joint 49. The other end of the shaft 47 is connected to one end of a second flexible joint 51, and the other end of the flexible joint 51 is coupled to, and drives a shaft 50. An arm 52, near the free end of which is mounted the flexible joint 51, is preferably connected to the frame 2 through a hingeable joint 53, so as to provide some springiness to the grinding discs 45.

For ease of construction, the shaft 50 preferably has a square cross-section, and the grinding discs 45, which are provided with matching square-shaped apertures, can then be mounted co-axially on the shaft 50. The outer of the two grinding discs 45 is restrained by a nut 55, or the like, from sliding beyond the end portion of the shaft 50, while a compression spring 54, interposed between the grinding discs 45, urges then apart.

The trench-digging machine, according to the present invention, can be used not only to dig trenches in arable soil, but also trenches in roads.

It will be apparent that numerous variations and modifications can be made in the present invention, without the exercise of any inventive ingenuity, by one skilled in the art.

I claim:

1. A trench-digging machine, normally movable in a forward direction, comprising in combination:
    a frame,
    rotatable soil-moving means mounted on said frame for digging a trench in the soil, and including a disc equipped with cutter means mounted on its periphery, thereby operatively throwing up earth,
    transmission-gear means mounted on said frame, coupled to said rotatable soil-moving means, and adapted to be powered by external drive means, said external drive means including a tractor,
    control means, including ski-means mounted substantially horizontally on the underside of said frame to set the depth of the trench cut by said soil-moving means,
    first and second supports for said ski-means located upstream and downstream of the cutter means—equipped disc, respectively, as defined by said forward direction of movement,
    at least partially curved soil-deflector means mounted on said frame for deflecting earth operatively thrown up by said soil moving means,
    rotatable and vertically movable trench side-surface processing means, including two rotatable grinding discs coaxially mounted on said frame downstream of said soil moving means for smoothing the side surfaces of said trench, respectively, said grinding discs being adapted to be powered by said external drive means, each grinding disc having a outwardly facing convex portion, and
    resilient means interposed between said grinding discs for urging them apart.

2. A trench-digging machine as claimed in claim 1, wherein said soil-moving means includes a disc having shovel means mounted on its periphery.

3. A trench-digging machine as claimed in claim 2, wherein said shovel means include a plurality of shovels closely fitted to said disc around the periphery thereof.

4. A trench-digging machine as claimed in claim 1, wherein said cutter means-equipped disc has a peripheral surface, and said cutter means includes a plurality of cutters disposed at respective preselected regions on one side of said cutter means-equipped disc near its periphery, and a block interposed between each cutter and said cutter means-equipped disc, each block having a radially outwardly facing surface inclined at an acute angle to said peripheral surface near a corresponding one of said regions.

5. A trench-digging machine as claimed in claim 4, wherein each cutter has a stem portion and a curved portion extending in at least a radially outward direction beyond said stem portion.

6. A trench-digging machine as claimed in claim 1, further comprising shaft means pivotable on said frame, and wherein said trench side-surface processing means is mounted on said shaft means.

7. A trench-digging machine as claimed in claim 1, wherein
    said soil-moving means includes a rotatable axle journalled in said frame,
    a soil-processing disc mounted near one end of said axle, and flywheel means mounted near the other end of said axle.

8. A trench-digging machine as claimed in claim 1, further including level-adjustment means for regulating the depth of the trench cut by said soil moving means.

9. A trench-digging machine, normally movable in a forward direction, comprising in combination:
    a frame,
    rotatable soil-moving means mounted on said frame for digging a trench in the soil, and including a disc equipped with cutter means mounted on its periphery, thereby operatively throwing up earth, each cutter of said cutter means having a stem portion and a curved portion extending in at least a radially outward direction beyond said stem portion, and being disposed at respective preselected regions on one side of said cutter means, a block being interposed between each cutter and said cutter-means-equipped disc, each block having a radially outwardly facing surface inclined at an acute angle to a peripheral surface of said disc near a corresponding one of said regions,
    transmission-gear means mounted on said frame, coupled to said rotatable soil-moving means, and adapted to be powered by external drive means,
    control means on the underside of said frame to set the depth of the trench cut by said soil-moving means,
    soil-deflector means mounted on said frame for deflecting earth operatively thrown up by said soil moving means, and
    rotatable and vertically movable trench side-surface processing means mounted downstream of said soil moving means as defined by said forward direction of movement.

10. A trench-digging machine as claimed in claim 9, wherein the curved portion of each cutter has a free end extending in a direction generally parallel to the tangent of a peripheral part of said disc disposed opposite said free end.

* * * * *